United States Patent [19]

Clusener

[11] 3,898,836

[45] Aug. 12, 1975

[54] DIFFERENTIAL DILATOMETER

[75] Inventor: Gerhard R. Clusener, Port Washington, N.Y.

[73] Assignee: Theta Industries, Inc., Port Washington, N.Y.

[22] Filed: Apr. 8, 1974

[21] Appl. No.: 458,592

[52] U.S. Cl. .................................................. 73/16
[51] Int. Cl. .......................................... G01n 25/16
[58] Field of Search .......................................... 73/16

[56] References Cited
UNITED STATES PATENTS

| | | | |
|---|---|---|---|
| 2,290,868 | 7/1942 | Eriksson | 73/16 |
| 2,559,789 | 7/1951 | Peckham | 73/16 |
| 3,022,664 | 2/1962 | Stolwiyk | 73/15 |
| 3,033,020 | 5/1962 | Pakulak, Jr. et al. | 73/15 |
| 3,059,471 | 10/1962 | Calvet | 73/15 |
| 3,680,357 | 8/1972 | Clusener | 73/16 |
| 3,748,892 | 7/1973 | McKendree | 73/16 |

FOREIGN PATENTS OR APPLICATIONS

| | | | |
|---|---|---|---|
| 1,134,086 | 11/1968 | United Kingdom | 73/16 |

*Primary Examiner*—Herbert Goldstein
*Attorney, Agent, or Firm*—Leonard H. King

[57] ABSTRACT

In a dilatometer, of the type having a linear variable differential transformer and first and second push rod means of substantially equal length responsive thereto, means are provided for accurately and simultaneously measuring dimensional changes that result from thermal variations. Either expansion or contraction, of two different, elongated test samples can be measured. To assure maximum accuracy, means are also provided for compensating for minute differences in the lengths of the push rods which are positioned with thermal symmetry in a furnace. The linear variable differential transformer components are mounted in a frictionless manner and includes individual interleaved cantilevered spring support means and a ball anvil that provides the coupling means between the transformer and a micrometer that is used as a feed screw for electrical zeroing. One of the test samples is in contact with the first push rod that moves the core of the linear variable differential transformer while the other test sample is in contact with the second push rod that moves the coil of the linear variable differential transformer. Both test samples are coupled to the push rods that the samples are mounted symetrically with respect to the wall of the furnace and are measured simultaneously.

10 Claims, 10 Drawing Figures

DIFFERENTIAL DILATOMETER

The aforementioned Abstract is not intended to define the invention of the application which, of course, is measured by the claims, nor is it intended to be limiting as to the scope of the invention in any way.

BACKGROUND OF THE INVENTION

1. Field of the Invention

This invention relates generally to measuring instruments such as dilatometers and more particularly to an improved, differential dilatometer for simultaneously measuring changes in dimension of two different test samples, one of which may be a reference sample of known accuracy.

2. Description of the Prior Art

Dilatometers are used for measuring the linear thermal expansion of solids. They are also used for determining the coefficient of linear, thermal expansion as well as to detect phase transitions in material for analytical purposes. Some applications of the dilatometer include the measurement of change in the crystallographic structure of material. That is, the transition point and softening point in plastics, or the continuous cooling curve transformation in steel.

Another application of a dilatometer is the study of the compatibility of materials under changing temperature conditions, for example, metal to glass, enamel to substrates, thin film depositions on microcircuits or matching tooth fillings with the natural material of teeth. A dilatometer may also be used for process simulation, such as firing of ceramics, heat treating of metals (annealing and quenching), sintering of powders and composite material and measurement of minerals.

The common dilatometer consists mainly of three major sections which include a furnace with a temperature control, the actual dilatometer with a measuring unit and suitable recording equipment. There are many examples of commercial furnaces and programmers as well as recorders. However, there are only a very limited number of dilatometer measuring units. One widely used dilatometer has a ball bearing push rod support. This construction has the disadvantage of moving freely only under ideal conditions. Thus, dried out oil and improper adjustment make the function of the instrument questionable and hence the output of the device unreliable.

A specific form of a differential dilatometer is disclosed in British Patent Specification No. 1,134,086 wherein a test sample is used in conjunction with a referencee sample and the two samples are mounted on separate push rods that are remote from a vacuum port so that a vacuum of $10^{-6}$ cannot be achieved. The structure disclosed in the British patent is intended primarily for remote control operation through lead walls for radiation studies in an enclosed chamber. In the British Patent Specification one of the two push rods is substantially closer to the wall of the furnace than the other push rod. In contrast to the present invention the British Patent Specification contains no suggestion of or need for push rods of substantially equal length and which are symmetrical with the wall of the furnace. Nor is there any suggestion of adjustment of or compensation for different push rod lengths. Accordingly, the structure taught by the British Patent Specification is in an accuracy category that is different than that of the present invention and, in addition, is not adaptable to a varying length of the two original samples. It should be further noted that the structure disclosed in the British patent requires lubrication for the sliding push rods and transformer members whereas, by way of contrast, in the present invention the coil and core of the transformer are mounted on interleaved springs together with the push rods to minimize friction and to eliminate the need for lubrication. The construction of the present invention prevents contamination of the vacuum due to vaporization of the lubricant which would prevent the attainment of a high vacuum.

Another form of dilatometer is illustrated and disclosed in U.S. Pat. No. 3,680,357 granted to Gerhard R. Clusener on Aug. 1, 1972. The structure described in the issued U.S. patent overcomes the shortcomings of the previously mentioned prior art and is particularly advantageous where only a limited space is available such as vacuum chambers, hot cells, etc. The structure disclosed in the issued U.S. patent is compact and self contained to thereby minimize temperature and differential effects. A ball anvil couples a module which is defined by a linear, variable, differential transformer that is adjustable and a micrometer that is used for calibration and zeroing purposes.

Interleaved leaf springs individually support the coil and the core of the linear, variable differential transformer and the test sample is in contact with a push rod that is responsive to the movement of the core. A push-rod force of 0–100 grams can be applied to the test sample. Lower push rod forces, for example in the range of 0–10 grams can be achieved by different leaf springs. In the structure disclosed in the aforementioned issued U.S. patent, the work piece is supported in a fused quartz tube that is adapted to be positioned within a furnace. While the furnace is brought up to temperature, the expansion of the test sample is transferred through the push rod into the measuring head. By way of example, the core and hence the push rod may have a range of ±0.050 inch. The differential transformer changes the variation in the length of the tested sample into an electrical signal and a demodulator conditions the resultant signal for suitable recorder display.

SUMMARY OF THE INVENTION

The present invention utilizes the basic structure disclosed in the aforementioned U.S. Pat. No. 3,680,357. Two samples, the reference and the test specimen, are measured simultaneously in a high vacuum, for example at $10^{-6}$ Torr., with two push rods of substantially equal length that are oriented parallel to each other and symmetrically with respect to the wall of the furnace in order to provide a more accurate reading and a more uniform heating of the test sample respectively for example to a temperature in the order of 1,600°C. Because of the frictionless mounting of the coil and core in the present invention, friction is virtually absent and lubrication is not required. By making the push rods of substantially equal length errors due to expansion or contraction of the push rods themselves is minimized. Since it is recognized that for practical purposes the push rods cannot have exactly the same length, means in the form of a millivolt source are used to achieve electrical zeroing.

One of the push rods is linked to the frictionless mounted coil of the linear variable differential transformer while the other push rod is linked in a like frictionless manner to the core thereof. Only differences in dimensional changes are recorded and an accuracy of 25 to 50 parts per million and a repeatability of 5 to 10 parts per million is possible. In the issued U.S. patent referred to hereinabove it is necessary to add a correction factor after calibration of the module and this correction factor could be as much as 50 percent. By way of contrast, in the present invention, only differences in dimensional changes are recorded. Any expansion of the tube and the rods cancel each other out.

The differential dilatometer comprising this invention is capable of operating in a chamber evacuated to $10^{-6}$ Torr. or in a pressurized environment or with a continuous gas flow within its cover, measuring system and sample areas. Suitably located passageways provide means for maintaining a constant temperature of 40° ±0.02°C by circulating a temperature controlled fluid. Constant temperature control not only provides a stable thermocouple reference junction but also minimizes undesirable dimensional instability of the measuring components due to effects of room temperature variation and furnace radiation and conduction.

The present invention utilizes a massive, temperature stabilized Invar rod having passages for permitting the flow of a temperature controlling fluid. A rack and pinion arrangement permits precise adjustment of the module in order to adjust for various sample lengths. The Invar rod is rigidly secured to a head plate in which is provided electrical receptacle means, input and output ports for a temperature controller fluid as well as gas and vacuum ports.

Thus it will be seen that the present invention provides unique testing means since quite frequently it is necessary to match the expansion of two materials regardless of their absolute expansion. Instead of going through the procedure of measuring both materials, one after the other, with a calibrated dilatometer, the present invention provides means for measuring both samples simultaneously with a differential dilatometer. The measuring time as well as the interpretation time can be cut in half using the present invention because no correction for the measuring system is required and the mismatch between the two materials can be read directly in microns from a chart.

Accordingly, it is a primary object of the present invention to provide an improved differential dilatometer, as described above, for measuring the thermal properties of materials.

Another important object of the present invention is to provide an improved instrument, as described above, for simultaneously measuring the thermal properties of one test sample with respect to another test sample that has known and precisely controlled properties.

A feature of the present invention is that a linear, variable, differential transformer is used for measuring dimensional changes of one of the two materials independently of and with respect to the other.

An advantage of the present invention is that the core and the coil of the linear, variable, differential transformer are flexibly mounted on interleaved cantilevered spring members and are independent of each other.

Another feature of the present invention is the use, in a differential dilatometer such as described above, of a micrometer feed screw coupled to the linear variable differential transformer by means of a ball anvil contact member for calibration purposes only.

These and other features, objects and advantages of the invention will, in part, be pointed out with particularity, and will, in part, become obvious from the following more detailed description of the invention, taken in conjunction with the accompanying drawings, which form an integral part thereof.

BRIEF DESCRIPTION OF THE DRAWING

In the various figures of the drawings, like reference characters designate like parts.

DESCRIPTION OF THE PREFERRED EMBODIMENT

Figure 1:
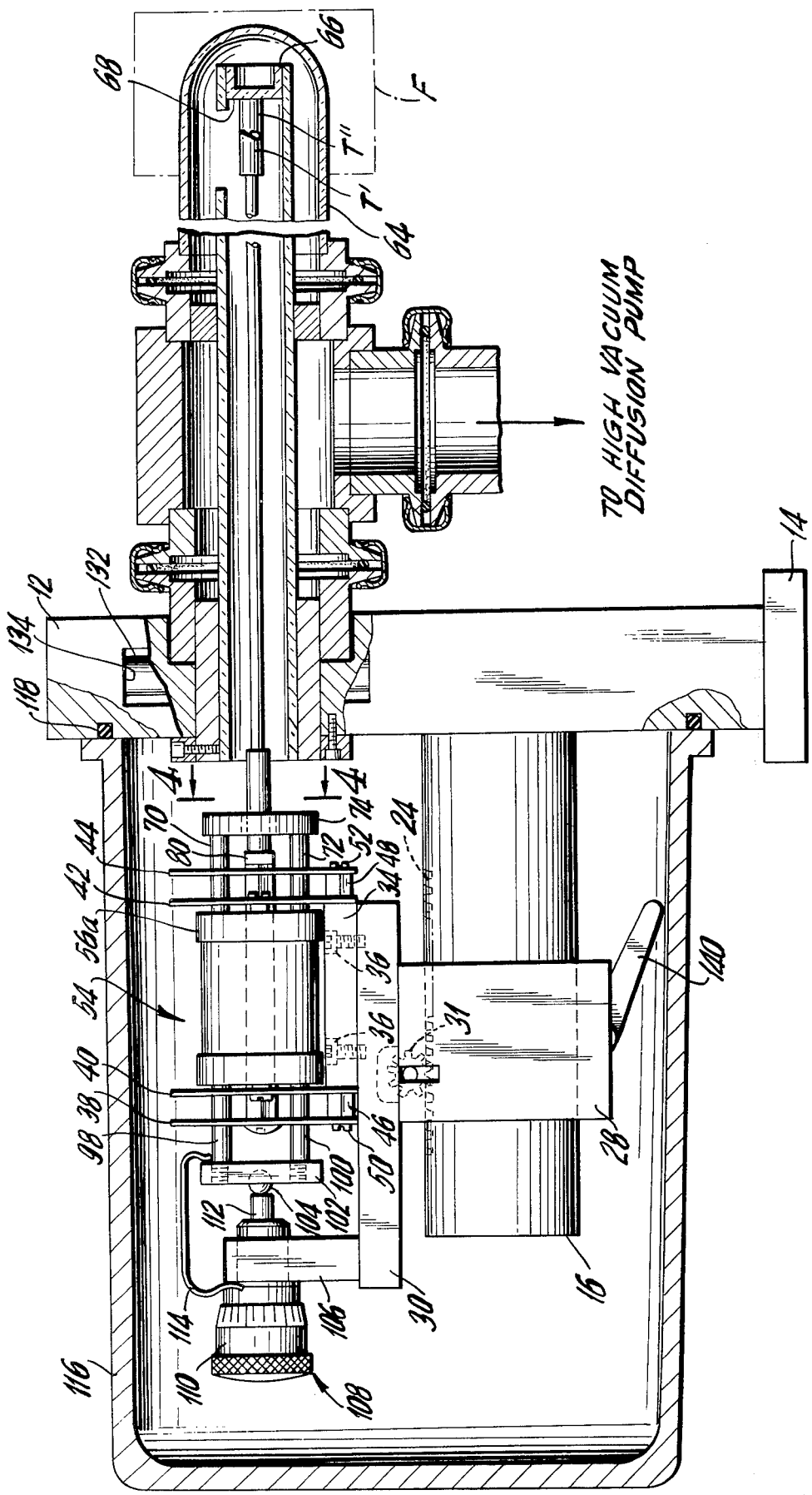
FIG. 1 is a side elevational view of the present invention, partially in section and partially broken away.

Referring now to the drawings, and in particular to FIG. 1, there is shown one embodiment of the differential dilatometer comprising the present invention. There is provided a vertical head plate 12 having a mounting base 14. A relatively massive, temperature stabilized Invar post 16, having a low coefficient of expansion is secured to the upright head plate 12 by any suitable means such as an epoxy adhesive or any suitable fastener. The Invar post 16 has a longitudinal keyway 20 formed on the surface thereof that mates with a fixed guide rod 22. A rack 22 is aso formed on the exterior surface of the Invar post 16. Suitable fastener means are used to clamp a carriage 28 to the Invar post 16. A mounting plate 30 is suitable secured to the top of the carriage 28 by means of suitable fasteners and is provided with a pinion 31 that meshes with the rack 24.

Secured to the mounting plate 30 are a pair of longitudinally extending and laterally spaced blocks 34 that are secured thereto by means of screws 36. Beryllium bronze spring means 38, 40, 42 and 44 are mounted on the ends of the block 34 by means of spacers 46, 48 and screws 50, 52 respectively. The spring means 38, 40, 42 and 44 are interleaved and mounted in a cantilevered arrangement.

Figure 5:
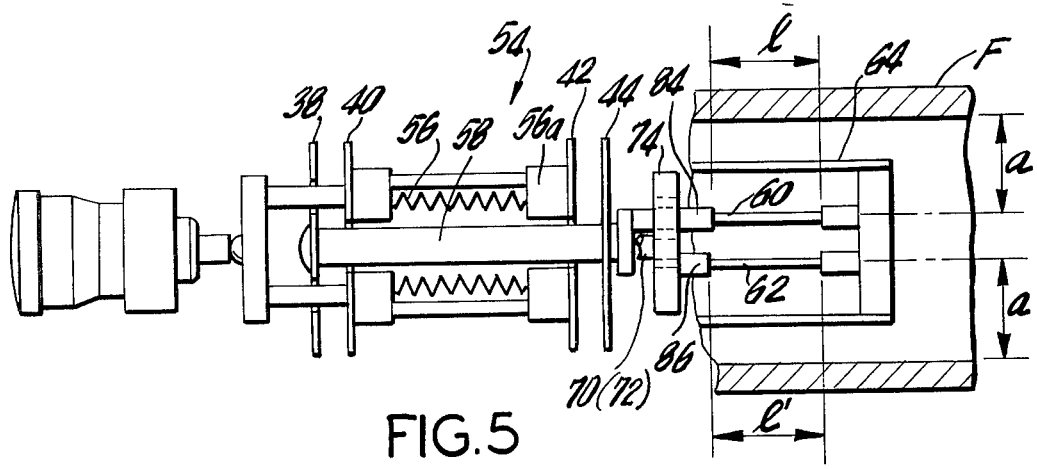
FIG. 5 is a schematic plan view of the apparatus shown in FIG. 1.
Figure 4:
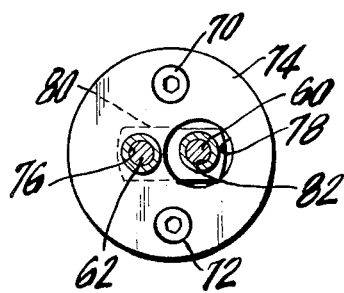
FIG. 4 is a sectional elevational view taken along line 4—4 of FIG. 1.

As shown particularly in FIG. 5, the present invention is further comprised of a linear, variable, differential transformer 54 that includes a coil 56 and a core 58 that is coaxially positioned within the interior of the coil 56. A pair of push rods 60 and 62 of substantially equal lengths as shown in FIG. 5 are coupled, respectively, to the coil 56 and the core 58 in a manner to be described more fully hereinafter.

One means for mounting the test samples T' and T'' is also shown in FIG. 5. A fused quartz sleeve 64 is coaxially positioned about the free end of the push rods 60 and 62. The sleeve 64 is provided with a plug 66 having an inner surface 68 that is ground square and perpendicular to the axes of the push rods 60 and 62. The test samples T' and T'' are positioned between the inner plug surface 68 and the end of the push rods 60 and 62, the entire assembly being positioned, as shown in FIG. 1, within a furnace F. A feature of this invention is that the push rods 60 and 62 are equispaced by a dimension $a$ from the walls of the furnace F.

In order to accurately mount the push rods 60 and 62, a pair of spacers 70 and 72 are secured to one end face of the coil housing 56a. The spacer 70 is positioned above the leaf spring means 42 and 44 while the lower spacer 72 passes loosely through the leaf spring means 44 and above the leaf spring means 42. A first, disc-like end plate 74 is secured to the outer end of the spacers 70 and 72. A first tapped hole 76 and a second through hole 78 are formed in the end plate equidistant from the center thereof and from the longitudinal axis of the core 58. A second end plate 80 is secured to the core 58 and to the leaf spring means 44. A second tapped hole 82 is formed in the second end plate 80, coaxial with the through hole 78 in the first end plate 74. Tubular Invar holders 84 and 86 are threaded into the tapped holes 76 and 82, respectively and push rods 60 and 62 are placed in and secured to the holders 84 and 86, respectively.

It should be clearly noted that the present invention is not limited to the mounting means that has been illustrated in FIG. 1. Alternative mounting means, for example such as shown in the aforementioned U.S. Pat. No. 3,680,357, may also be employed.

Turning now to FIGS. 6, 7, 8, and 9, it will be seen that the cantilevered, interleaved spring arrangement provides frictionless independent mounting means for the coil 56 and the core 58. This arrangement assures small physical dimensions and minimal thermal expansion of the module itself.

Figure 6:
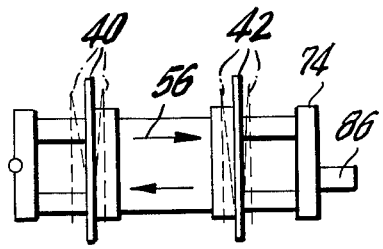
FIG. 6 is a schematic plan view of the cantilevered leaf spring mounting means for the coil of the linear variable differential transformer shown in FIG. 1.
Figure 7:
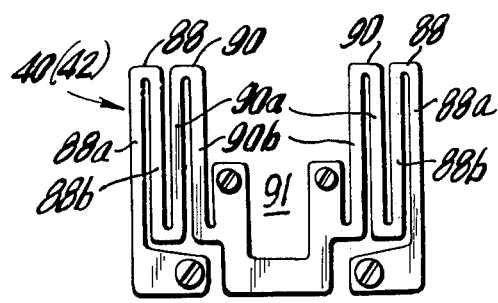
FIG. 7 is an elevational view of the cantilevered leaf spring mounting means for the coil of a linear variable differential transformer as shown in FIG. 6.
Figure 8:
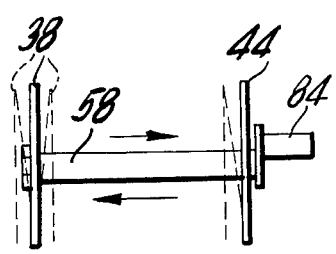
FIG. 8 is a schematic plan view of the cantilevered leaf spring means for the core of the linear variable differential transformer as shown in FIG. 1.
Figure 9:
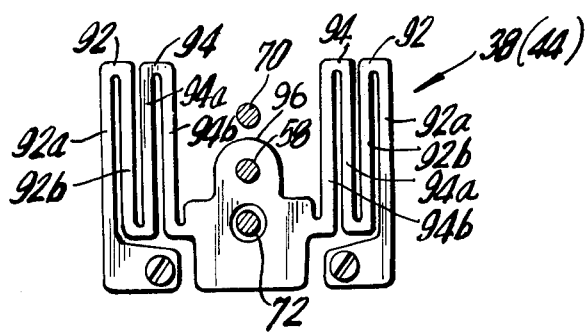
FIG. 9 is an elevational view of the cantilevered leaf spring mounting means that may be used for the core of the linear variable differential transformer as shown in FIG. 8.

As shown in FIGS. 6 and 7, spring means 40 and 42 that support the linear variable differential transformer coil 56 are both comprised of four laterally spaced apart legs 88 and 90 having a gap 91 between the two innermost legs 90 through which the core 58 passes. The legs 88 and 90 are each subdivided into sections 88a, 88b and 90a, 90b, respectively. Leaf spring means 38 and 44, as shown in FIGS. 8 and 9, are also comprised of four pairs of laterally spaced apart legs 92 and 94 with a fifth leg 96 intermediate the two innermost legs 94. The legs 92 and 94 are each subdivided into sections 92a, 92b, and 94a, 94b, respectively. The core 58 is suitably secured to the legs 96. In contrast to the aforementioned U.S. Pat. No. 3,680,357 both leaf spring means 40 and 42 are in the form of a U that is open upwardly to facilitate removal of the push rods 60 and 62.

A pair of spacers 98 and 100 are secured to the end face of the coil housing 56a that is remote from the push rods 60 and 62. The spacer 98 is positioned above the leaf spring means 38 and 40 while the lower spacer 100 passes loosely through the leaf spring means 38 and above the leaf spring means 40. A third end plate 102 is secured to the outer end of the spacers 98 and 100. A ball anvil 104 is retained in the third end plate 102.

A split clamp 106 is secured to the mounting plate 30 in opposition to the third end plate 102 and the ball anvil 104. A micrometer 108 comprised of a coupled thimble 110 and spindle 112 is retained in the split clamp such that the spindle 112 is in coaxial opposition to the ball anvil 104. A removable, light U-shaped spring clip 114 couples the third end plate 102 and the split clamp 106.

Figure 2:
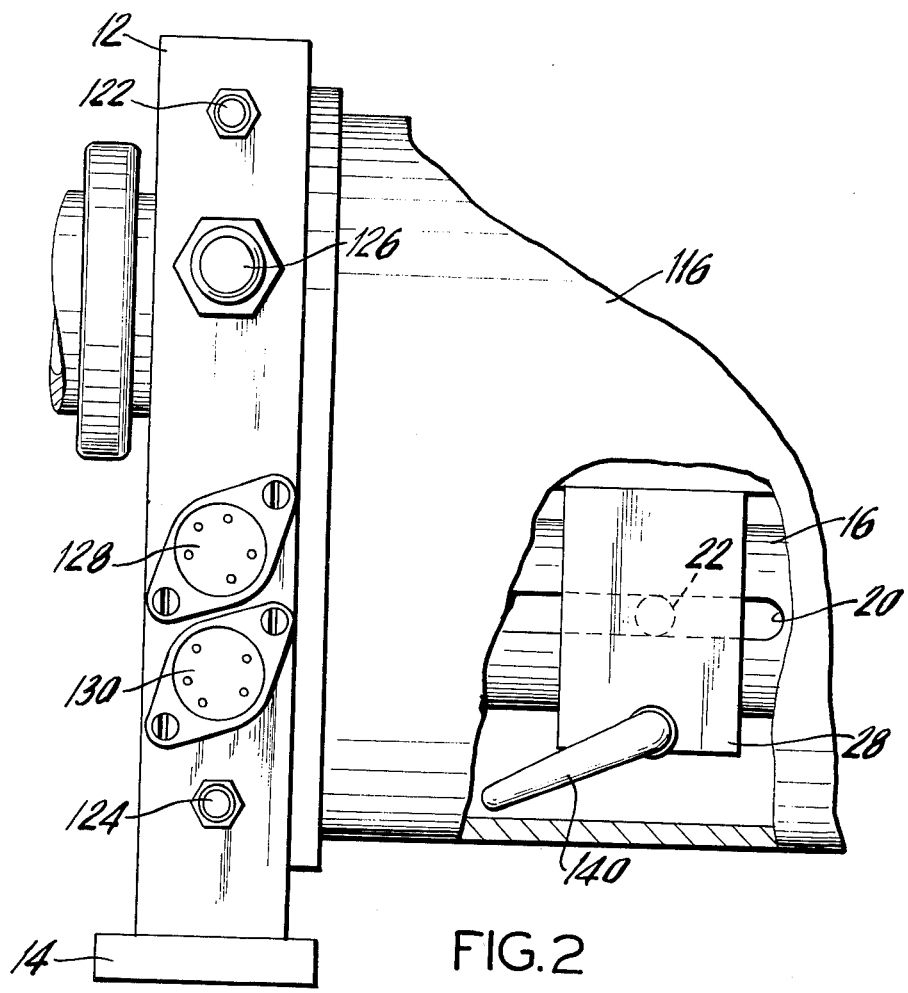
FIG. 2 is a fragmentary side elevational view opposite to that shown in FIG. 1.
Figure 10:
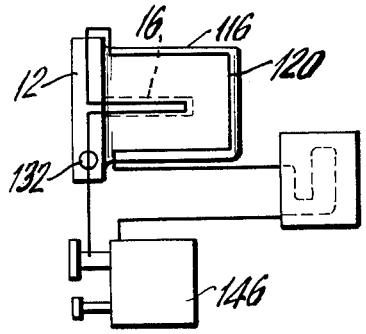
FIG. 10 is a schematic illustration of a differential measuring system comprising the present invention showing the thermal stabilization of the head and the exciter demodulator by means of a constant temperature circulator.

Still other features of this invention may be seen in FIGS. 1 and 2. A cast aluminum cover 116 sealingly secured over the module to the head plate 12 by means of suitable fasteners and a peripheral O-ring 118. The cover 116, as may best be seen in FIG. 10, includes passageway means 120 defined by cast-in-place stainless steel tubing that will not corrode. A temperature controlled fluid is circulated within the passageway means. Fittings 122 and 124 in the head plate 12 provide input and output means for the temperature controlling fluid. If desired a vacuum or gas supply fitting 126 may also be provided in the head plate 12, as shown in FIG. 1. Conveniently, electrical connectors 128 and 130 are provided in the head plate 12 for the measuring module and a thermocouple, respectively.

As shown in FIG. 1 a thermometer 132 is mounted within a cavity in the head plate 12 and is visible through an opening 134 so that the temperature of the head plate may be visually monitored to an accuracy of ±0.02°C.

Figure 3:
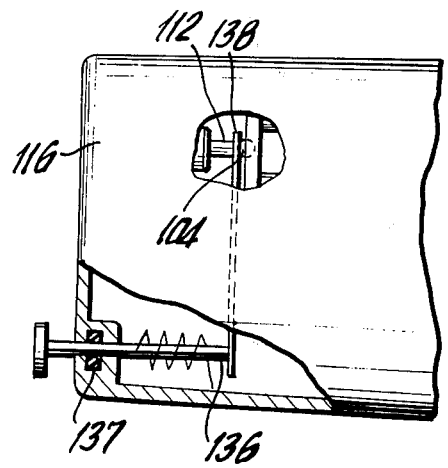
FIG. 3 is a fragmentary plan view of the structure shown in FIG. 1.

Turning now to FIG. 3 there is shown structure that is used to length calibrate the linear variable differential transformer more accurately than is possible with a micrometer, and to provide means to weight calibrate the module. A spring biased shaft 136 passes through a wall of the cover 116 and is sealed with respect thereto by means of an O-ring. A precision gage block 138, for example, in the order of 0.010 inch thick is secured to the inner end of the shaft 136 and is arranged to be selectively positioned between the ball anvil 104 and the micrometer spindle 112. A test sample is placed on one of the push rods and a slight pressure to the core push rod 62. The other push rod 60 must be free to move. The output of the module is then zeroed by first turning on electrical power to the module as well as the system read out equipment. The micrometer thimble 110 is then rotated until the readout device indicates zero or null and the micrometer reading is noted. The micrometer thimble 110 is rotated counterclockwise 0.020 inch. A gram scale is then pressed against the push rod 62 until the readout device again indicates zero or null. The gram scale is read and the result is divided by 20 to determine the number of grams per 0.001 inch movement of the push rod 62. The micrometer thimble 110 is again rotated to reach the null reading recorded in the previous step. A determination is then made of the number of grams of beginning pressure desired for the particular test being run. The number of grams of beginning pressure is then divided by the grams per 0.001 inch determined in the previous step to obtain the distance the micrometer thimble 110 must be turned. For example:

$$\frac{50 \text{ grams desired}}{5 \text{ grams}/0.001 \text{ inches}} = 0.010 \text{ inch}$$

The micrometer thimble 110 is then rotated counterclockwise for the equivalent of 0.010 inch. The desired sample force is applied by sliding the module along the Invar post 16 to press the push rod 62 against the sample until zero or null is again indicated on the readout device. The module is then locked in place on the Invar post 16 using a lever 150.

In one embodiment of this invention travel of the core 58 is ±0.050 inch for linear output. All of the foregoing zeroing will place the core 58 in the center of the total 0.100 inch linear range. This will allow a change of sample length of 0.050 inch in either direction. Where changes in length of the sample are in one direction only the total 0.100 inch linear travel of the core 58 may be utilized by displacing the coil 56 a distance of 0.050 inch from the null reading obtained with the sample in place.

For expansion measurement only the micrometer thimble 110 is turned counterclockwise 0.050 inch from the null reading obtained with the sample in place. For contraction measurement only the thimble 110 is rotated 0.050 inch in a clockwise direction from the null reading with the sample in place. This procedure allows 0.100 inch sample length change with linear output. However, it will be necessary to re-zero the system readout after the above.

INSTALLING THE SAMPLE

Samples of equal length, within a tolerance of 0.0005 inch, should be used to ensure the most accurate differential results. The spring clip 114 is removed and the thimble 110 is rotated counterclockwise so that is is disengaged or more. The two samples T' and T'' are placed on their respective push rods 60 and 62 and the desired pressure is applied by sliding the module on the Invar post 16 towards the samples T' and T''. A near zero output from the module will indicate proper placement of the samples T' and T''.

If the expansion of the push rods 60 and 62 were equal, no system correction factor need be added to the results. However, it is impractical to supply push rods 60 and 62 of precisely the proper length so as to define a perfectly matched pair. Accordingly, the micrometer thimble 110 is rotated in either direction so that the spindle 112 bears against the ball anvil 104 and displaces the core 56 to achieve electrical zero. The gage block 138, which may be manually displaced or remotely controlled electrically by a small motor, is then positioned between the ball anvil 104 and the free end of the micrometer spindle 112. The coil 56 and the push rod 60 are displaced thereby producing a deviation on the recorder. The gain of the signal conditioner 146 or that of a recorder amplifier-driver (not shown) is then changed to obtain unity on the recorder chart. This last step is not essential but it is convenient. The interior of the cover is preferably evacuated to minimize the possibility of temperature changes or currents.

From the foregoing it will be appreciated that an extremely accurate, calibrated differential dilatometer has been provided for simultaneously measuring two test samples in a high vacuum that may be as much as $10^{-6}$ Torr. The construction disclosed herein eliminates the need for adding a correction factor after calibration since only differences in dimensional changes are recorded and the expansion of the measuring system itself is cancelled out. Means are provided for compensating for minor differences in the lengths of the push rods. A compact construction is achieved by independently mounting the core and the coil of the linear, variable differential transformer on interleaved, cantilevered spring means and by mounting one of the test samples on the push rod that is coupled and responsive to the movement of the coil.

There as been disclosed hereinbefore the best embodiment of the invention presently contemplated. However, it is to be understood that the various changes and modifications may be made thereto without departing from the spirit of the invention.

What I claim as new and desire to secure by Letters Patent is:

1. A differential dilatometer for simultaneously measuring in a furnace the thermal properties of two samples, one with respect to the other, said dilatometer comprising:
   a. a linear variable differential transformer including coil means and a core freely floating therein;
   b. first and second cantilevered spring means for independently supporting said coil means and said core with respect to each other;
   c. first and second push rods of substantially equal length coupled to said coil means and said core, respectively, and symmetrically with respect to the wall of the furnace;
   d. feed means positioned in opposition to said core, for axially displacing said core with respect to said coil means to achieve electrical zero and thereby compensate for differences in length of said first and second push rods;
   e. gauge means adapted to be positioned between said feed means and the end of said coil that is in opposition thereto to provide a known separation between said feed means and said coil; and
   f. means for maintaining one of the samples in contact with each of said push rods.

2. The dilatometer in accordance with claim 1 wherein said feed means is a micrometer having an axially displaceable spindle.

3. The dilatometer according to claim 2 wherein said core includes an anvil in opposition to said spindle of said micrometer.

4. The dilatometer according to claim 3 wherein said anvil is a freely rotatable ball.

5. The dilatometer according to claim 1 further including a cover for sealing enclosing said dilatometer.

6. The dilatometer according to claim 5 wherein said cover includes a sealed window for visually inspecting said gauge means.

7. The dilatometer according to claim 5 wherein said cover includes means for circulating a cooling fluid therethrough.

8. The dilatometer according to claim 7 wherein there is further included a thermometer for indicating the temperature within said cover.

9. The dilatometer according to claim 5 wherein said gauge means includes a shaft integral therewith, said shaft extending through said cover for permitting the external actuation of said shaft.

10. The dilatometer according to claim 9 wherein there is further included spring means for angularly biasing said shaft.

* * * * *